US010176523B1

(12) United States Patent
Pathak et al.

(10) Patent No.: US 10,176,523 B1
(45) Date of Patent: Jan. 8, 2019

(54) SYSTEM AND METHOD FOR AUTOMATED TRADE PROCESSING (71) Applicant: Vestmark, Inc., Wakefield, MA (US)

(72) Inventors: Heeren H Pathak, Lexington, MA (US); Ladislav Kis, North Andover, MA (US); Neal Hartmann, Merrimack, NH (US)

(73) Assignee: Vestmark, Inc., Wakefield, MA (US)

( * ) Notice: Subject to any disclaimer, the term of this patent is extended or adjusted under 35 U.S.C. 154(b) by 563 days.

(21) Appl. No.: 14/851,910

(22) Filed: Sep. 11, 2015

Related U.S. Application Data (63) Continuation of application No. 12/057,710, filed on Mar. 28, 2008, now abandoned.

(60) Provisional application No. 60/909,190, filed on Mar. 30, 2007.

(51) Int. Cl.
G06Q 40/04 (2012.01)
G06F 17/30 (2006.01)

(52) U.S. Cl.
CPC ....... G06Q 40/04 (2013.01); G06F 17/30386 (2013.01)

(58) Field of Classification Search
CPC ................ G06Q 40/04; G06Q 40/00
USPC ....................................... 705/3–44
See application file for complete search history.

(56) References Cited

U.S. PATENT DOCUMENTS 6,442,620 B1 * 8/2002 Thatte ..................... G06F 9/465
719/316
6,571,222 B1 * 5/2003 Matsumoto ........ G06Q 20/3674
705/64
8,533,104 B2 * 9/2013 Cheng ..................... G06Q 40/04
705/37
8,600,867 B2 * 12/2013 Chiulli ................ G06Q 40/025
705/37
2004/0039663 A1 * 2/2004 Kernz ............... G06F 17/30274
705/26.3

(Continued)

OTHER PUBLICATIONS

Office Action from U.S. Appl. No. 12/057,710 dated Jun. 10, 2010.

(Continued)

Primary Examiner — Frantzy Poinvil
(74) Attorney, Agent, or Firm — Adsero IP (57) ABSTRACT An order management system and method are provided for automated management of the trading activity between a buy-side firm and sell-side firm. A trade rotation list is defined that governs trades. Items on the trade rotation list are defined by at least one characteristic that is used to match a trade by assigning a sequence number to that trade. An eligibility policy and a rotation method can be defined for each trade list. The rotation method rotates the sequence in which sponsors receive block trades, so that sponsors alternate the advantage of trading first. A trade route within an order management system comprises a trade context and an allocation context. One of the trade context or allocation context or both are referenced by metadata characteristics. If the trade route references a context by name, then the trade order is routed to the trade proxy associated with the context. If the trade route references the context by metadata, then the context to be used is determined by looking up metadata of a trade order using the metadata specified in the trade route and matching that to the metadata of the context.

9 Claims, 5 Drawing Sheets

(56) References Cited

U.S. PATENT DOCUMENTS

| | | | |
|---|---|---|---|
| 2005/0091145 A1* | 4/2005 | Baker | G06Q 40/04 705/37 |
| 2006/0167784 A1 | 7/2006 | Hoffberg | |
| 2008/0243713 A1 | 10/2008 | Chiulli | |
| 2009/0112775 A1* | 4/2009 | Chiulli | G06Q 40/025 705/36 R |
| 2009/0210338 A1* | 8/2009 | Hor | G06Q 40/04 705/37 |
| 2011/0166982 A1* | 7/2011 | Cole | G06O 40/04 705/37 |

OTHER PUBLICATIONS

Office Action from U.S. Appl. No. 12/057,710 dated Mar. 4, 2011.
Office Action from U.S. Appl. No. 12/057,710 dated Jun. 25, 2014.
Office Action from U.S. Appl. No. 12/057,710 dated Mar. 13, 2015.
U.S. Appl. No. 60/791,209, filed Apr. 12, 2006.
U.S. Appl. No. 60/899,393, filed Feb. 5, 2007.

* cited by examiner

SYSTEM AND METHOD FOR AUTOMATED TRADE PROCESSING

RELATED APPLICATIONS

This application is a continuation of U.S. patent application Ser. No. 12/057,710, filed Mar. 28, 2008, which claims priority from U.S. Provisional Patent Application Ser. No. 60/909,190, filed Mar. 30, 2007, each entitled "System and Method for Automated Trade Processing," each of which is hereby incorporated by reference.

TECHNICAL

The invention relates to a system and method for automated management of the trading activity between a buy-side firm and sell-side firm.

BACKGROUND

Various financial vehicles exist to aid in investing. For example, mutual funds are accounts that are professionally managed by portfolio mangers on behalf of many mutual-fund holders. Each shareholder participates in the gain or loss of the fund. Shares are issued and can be redeemed as needed. Mutual funds give small investors access to a well-diversified portfolio of equities, bonds, and other securities; however, the individual preferences of a single investor in a mutual fund are not taken into account. For example, since a mutual fund is managed as a single portfolio in a single account, the portfolio manager needs only to create trades in a single account to affect the investment of the mutual fund, thereby affecting the exposure for example of thousands or tens of thousands of clients.

In contrast to a mutual fund, a managed account is an investment account that is owned by an individual investor and looked after by a professional money manager. In contrast to mutual funds, managed accounts are personalized investment portfolios tailored to the specific needs of the account holder; however, a successful professional money manager is called upon to manage a large number of portfolios. When called upon to manage large numbers of managed accounts an investment manager encounters significant scalability challenges. In addition, without adequate controls in place the investment manager is unable to properly oversee that each account is adhering to a specific client's needs, goals, and constraints in a timely fashion.

One attempt to enable an investment manager to support thousands of managed accounts is a "model portfolio" (or "model"). The predominant type of model used for managed accounts is a "specific security model" (or "security model"). A security model lists a set of specific securities, each with a target position weight. By security, what is meant is an instrument representing ownership (stocks), a debt agreement (bonds), the rights to ownership (derivatives), and the like. Examples of securities can include a note, stock, preferred share, bond, debenture, option, future, swap, right, warrant or virtually any other financial asset.

Alternatively, a high-net worth manager will manage individual clients, but must manage these accounts in accordance with the guidelines of the firm. For example, to balance out risk exposure in the financial markets, an investment management firm may require that individual managers ensure that a client holds a certain amount in a specific set of asset classes. Since the manager is picking individual securities for a client, a specific security model cannot be used by the firm to dictate that a manager's model does not violate a firm's guidelines. This could open up the firm to potential financial liability if a client loses money due to their account being over exposed to a specific asset class. Since a firm can have hundreds or thousands of individual managers managing hundreds of accounts, this exposure creates a significant operational challenge. Firms can run a periodic analysis of a client's holdings to see if there are any violations that are occurring; however, this is a reactionary approach that still can hold the firm responsible for any financial costs in fixing a client's account.

Accordingly, there are several challenges facing investment managers who manage large numbers of managed accounts following a model-based approach. For example, in such managed accounts, high net worth accounts, institutional accounts, and the like, the size of a given trade orders can become big enough to impact the market. The ability for large trades to impact the market means that accounts that trade first can receive better pricing than accounts that trade later on. If a specific account is always trading first, then that account likely will always get the best prices for its trades, thus violating the principle of treating investors fairly. This is in contrast to retail accounts, where the size of a single trade order is not big enough to have an impact on the market.

This is an example of treating investors fairly. Treating investors fairly is a critical concept for the securities industry. If investors start to feel that they are disadvantages relative to other investors, their faith in the market will be impacted. This lack of faith could result in an unwillingness to invest. If this attitude became widely held, it would be the end of the market since the market cannot survive without investors.

A number of securities laws are written to specifically ensure investor fairness. In some cases, these laws prescribe specific types of rules to ensure fairness; in other cases, the laws prescribe the types of data that must be publicly available to allow investors to verify that they are being treated fairly. Compliance officers at investment companies are responsible for establishing corporate policies to ensure that personnel operate in a way to comply with the law. Some of these policies are design to comply with the letter of the law; others are design to comply with spirit of the law.

In addition, trade rotation is a common policy found at many investment companies. The rationale for trade rotation is to ensure that investors are treated equally. The goal behind any trade rotation policy is to establish a mechanism to ensure that accounts are treated fairly during trade processing. Typically, rotation policies establish a rotating sequence number scheme. Each trade is assigned a sequence number and the sequence number is used to govern how the trade is processed. Due to the complexity of the trading process, there are a number of ways that this sequence number can be used. Trade rotation policies also vary depending on the type of organization performing the trades.

Buy-side firms are responsible for sending trades to various executing brokers to service their accounts. Some accounts have directives that require trades to be sent to a specific executing broker. Other accounts give the firm discretion regarding the brokers they are allowed to use. Typically, a buy-side firm will aggregate trades with similar characteristics and send the order for multiple accounts together. This blocking of smaller trades into a large trade is done to provide better pricing in the market.

In one scenario, a firm will have multiple similar trades that need to be sent to multiple executing brokers. To ensure investor fairness, the trade rotation policy defines sequencing scheme for executing brokers that must be followed when sending trades to different executing brokers. In another scenario, the buy-side firm aggregates trades across accounts and, instead of sending the trades to multiple executing brokers, will "step-out" or "trade away" the trades to a single broker. This stepped-out trade will then be allocated back to the underlying accounts. Since it is possible that the entire trade amount will not be filled at the end of a trading day, some trade rotation policies define a sequence that defines how a "trade-away" trade is allocated back to the underlying accounts. In another scenario, buy-side firms have trades that have been aggregated by product (e.g., mutual fund trades, institutional trades, and managed account trades). In this scenario, trade rotation policies can determine which product trades first in the market or, if the product-level trades are aggregated and released to the market together, how the executions will be allocated back to the individual products.

Sell-side firms have a slightly different issue. Sell-side firms receive trades from multiple buy-side firms. Thus, sell-side firms need to ensure that buy-side firms are treated fairly. In one scenario, trade rotation policies at sell-side firms determine the sequence for processing trades from buy-side firms. This sequence number ensures that buy-side firms have the opportunity to trade first with their orders. In another scenario, the sell-side firm may aggregate the trades from multiple buy-side firms together. In this scenario, the trade rotation policy governs how executions are allocated to fill the trades requested by the buy-side firms.

Order management systems in the prior art are good at handling the common trading flows that are found with traditional institutional accounts and mutual fund accounts. However, trade order management systems in the prior art are not good at dealing with more specialize scenarios associated with managed accounts and types of accounts in the wealth management segment. Since the current tools do not support the specialized scenarios, the trades in dealing with these types of scenarios perform the work manually. This manual effort is a major source of inefficiency and errors and greatly increases the cost of dealing with these types of accounts. In addition, the prior art systems also can allow traders to manipulate the trade rotation and the trade rotation can be difficult to document, thus violating the trading fairness doctrine.

SUMMARY

An order management system and method are provided for automated management of the trading activity between a buy-side firm and sell-side firm. A trade rotation list is defined that governs trades. Items on the trade rotation list are defined by at least one characteristic that is used to match a trade by assigning a sequence number to that trade. An eligibility policy and a rotation method can be defined for each trade list. The rotation method rotates the sequence in which sponsors receive block trades, so that sponsors alternate the advantage of trading first. A trade route within an order management system comprises a trade context and an allocation context. One of the trade context or allocation context or both are referenced by metadata characteristics. If the trade route references a context by name, then the trade order is routed to the trade proxy associated with the context. If the trade route references the context by metadata, then the context to be used is determined by looking up metadata of a trade order using the metadata specified in the trade route and matching that to the metadata of the context.

BRIEF DESCRIPTION OF THE DRAWINGS

FIG. 1 shows an example of a trade blotter containing equity trades in accordance with the principles of the present invention.

FIG. 2 shows an example of a trade blotter containing fixed income trades in accordance with the principles of the present invention.

DETAILED DESCRIPTION

An order management system and method are provided for automated management of the trading activity between a buy-side firm and sell-side firm. Initially, an order management routine is described. When processing orders, order management systems define a route or destination that the trade needs and a way to format a trade for that route. For example, trading equities with UBS' MAC program is done via the FIX protocol, but trading with equities with UBS' ACCESS program is done via a file that needs to be generated and faxed. Similarly, when processing allocations, order management systems define a route or destination that an allocation needs to go and a way to format an allocation for that route.

This approach works well when the order management system is working with a small number of accounts with a small number of unique directed trading relationships, since the traders will be familiar with those accounts and know how to trade them. As the number of accounts and directed trading relationships grow, however, the complexity of the system grows exponentially.

With any directed trading accounts (e.g., managed accounts, intuitional accounts, private wealth accounts, etc), trading occurs between the buy-side firm having discretion over the account and sell-side firm to which trades are to be directed. The typical trading flow consists of orders (for one or more accounts), executions, and allocations being communicated between the buy-side and sell-side firms. The most common of these communication patterns follow the following scenarios:

In a 'standard order' scenario, the order contains trades for one or more accounts over which the buy-side has discretion. The sell-side firm is not aware of the details. In this case, the trade flow looks like the following: The buy-side firm sends the trade-order to the sell-side firm. The sell-side firm sends execution information to the buy-side for the order. The buy-side firm provides account-level allocation instructions to the sell-side firm detailing how the shares are distributed.

In an order with pre-trade allocation instructions, full-fill scenario, as part of the order the buy-side firm communicates to the sell-side firm both the total quantity of the order as well as the detailed account-level quantities that are to be used for allocation purposes. In this case, the trade flow looks like the following: The buy-side firm sends the trade-order to the sell-side firm. The sell-side firm sends the execution information to the buy-side to fully fill the order and uses the pre-trade allocation instructions to allocate shares to the specified accounts specified in the pre-trade allocation instructions.

In an order with pre-trade allocation instructions, partial-fill, buy-side account allocations scenario, as part of the order the buy-side firm communicates to the sell-side firm both the total quantity of the order as well as the detailed account-level quantities that are to be used for allocation purposes. In this case, the trade flow looks like the following: The buy-side firm sends the trade-order to the sell-side firm. The sell-side firm sends execution to the buy-side to for the order, but cannot provide the total quantity requested. The buy-side firm provides account-level allocation instructions to the sell-side firm detailing how the shares are distributed.

In a step-out order scenario, the buy-side firm communicates the order to a third-party sell-side firm who is not associated with the account. This type of trade is typically done because the third party sell-side firm provides better execution for the particular security than the directed sell-side firm. In this case, the trade flow looks like the following: The buy-side firm sends the trade-order to the third party sell-side firm. The sell-side firm sends execution to the buy-side to for the order. The buy-side firm provides account-level allocation instructions to the third party sell-side firm detailing how the shares are distributed to directed sell-side firms associated with each account in the allocation. The buy-side firm sends account allocation instructions to the directed sell-side firm with an explanation that the shares are coming from the third party sell side firm.

With managed accounts, there is a special type of trading flow that does not occur with traditional trade flows and is not supported by order management systems in the marketplace. In this order with pre-trade allocation instructions, partial-fill, sell-side account allocations scenario, as part of the order the buy-side firm communicates to the sell-side firm both the total quantity of the order as well as the detailed account-level quantities that are to be used for allocation purposes. In this case, the trade flow looks like the following: The buy-side firm sends the trade-order to the sell-side firm. The sell-side firm processes executions for the order, but cannot fully fill the order. The sell-side firm allocates the partially filled order to the accounts specified in the pre-trade allocation instructions. The buy-side firm provides an execution report detailing the amount executed and how the execution was allocated.

In a multi-sponsor environment, an optional trade rotation feature rotates the sequence in which individual sponsors receive block trades, so that sponsors alternate the advantage of trading first. This feature applies to trades assigned to the direct-to-sponsor trade route. In addition, trade allocation can be rotated for step-out trades (i.e., trades that are not sent to the sponsor). Trade rotation begins with releasing a set of block trades from the trader console. Trade rotation operates at the batch level within that set of released block trades. In other words, if there are two trade batches released at the same time, then both trade batches will rotate within themselves independently of the other.

Figure 3:
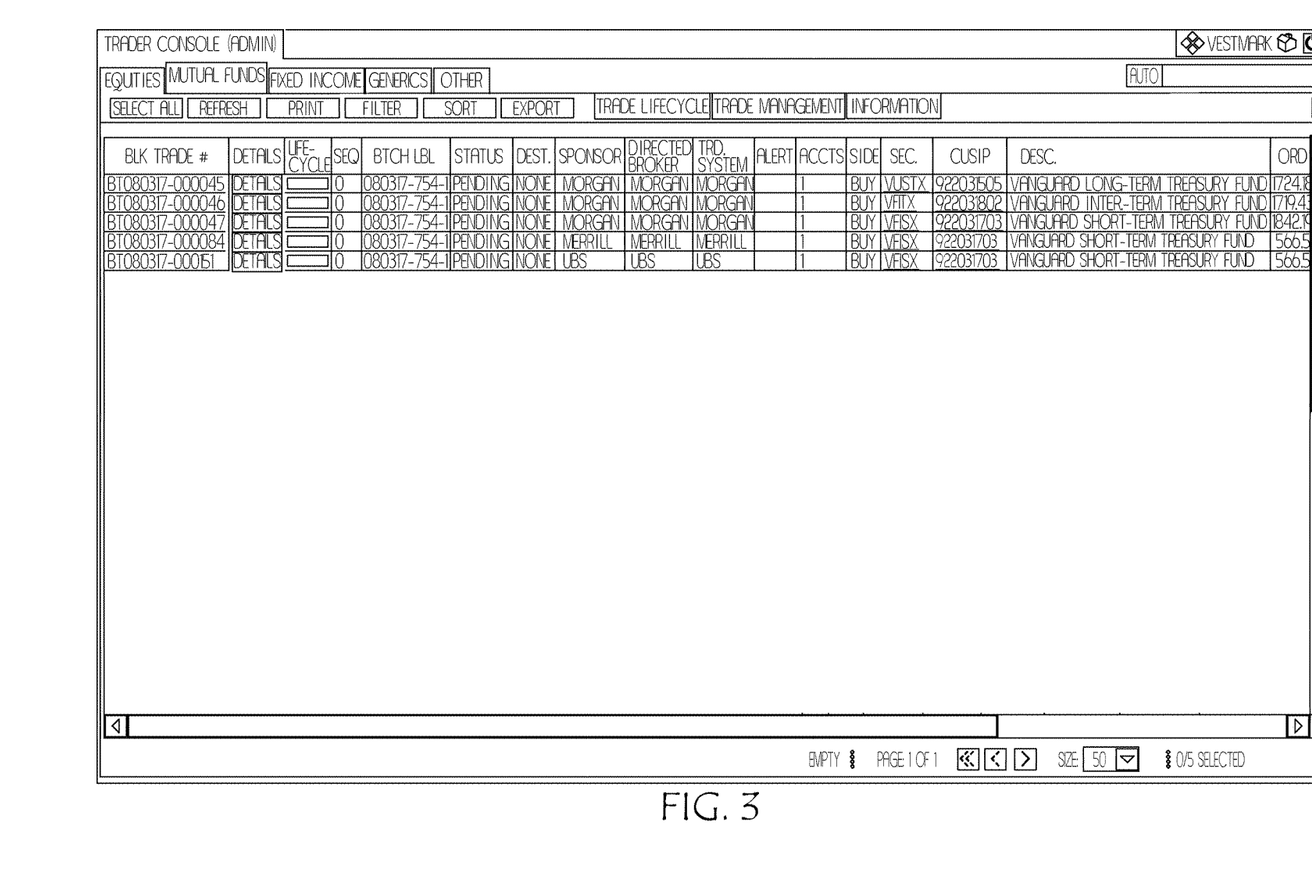
FIG. 3 shows an example of a trade blotter containing mutual fund trades in accordance with the principles of the present invention.

In one embodiment, for a block trade, a sequence number is provided which can be displayed on the trader console. This sequence number determines the order in which trades can be released to a particular sponsor. After a block trade has been executed, the next block trade in the sequence can be sent. FIG. 1 shows an example of a trade blotter containing equity trades in accordance with the principles of the present invention. FIG. 2 shows an example of a trade blotter containing fixed income trades in accordance with the principles of the present invention. FIG. 3 shows an example of a trade blotter containing mutual fund trades in accordance with the principles of the present invention.

The following non-limiting example shows a list of block trades in the trader console and is provided for illustrative purposes only and is not intended to limit the scope of the invention:

Example—Block Trades

| Security | Side | Sponsor | Seq | Batch Label |
|---|---|---|---|---|
| IBM | BUY | MRL | 1 | trade-batch-a |
| GE | BUY | MRL | 1 | trade-batch-a |
| GE | BUY | SB | 2 | trade-batch-a |
| GE | BUY | UBS | 3 | trade-batch-a |
| APPL | BUY | SB | 2 | trade-batch-a |
| APPL | BUY | UBS | 3 | trade-batch-a |
| IBM | SELL | UBS | 3 | trade-batch-a |

When the trades are released by the trader, the trades will be processed in the following way:

| Security | Side | Sponsor | Seq | Status |
|---|---|---|---|---|
| IBM | BUY | MRL | 1 | Released to Market |
| GE | BUY | MRL | 1 | Released to Market |
| GE | BUY | SB | 2 | Awaiting GE BUY MRL |
| GE | BUY | UBS | 3 | Awaiting GE BUY SB |
| APPL | BUY | SB | 2 | Released to Market |
| APPL | BUY | UBS | 3 | Awaiting APPL BUY UBS |
| IBM | SELL | UBS | 3 | Released to Market |

Trades released for the Sponsor "MRL" are sent immediately to the market because MRL is the first in the rotation sequence. The APPL BUY for SB and the IBM SELL for UBS are also released to the market immediately because there are not similar trades with a higher rotation sequence present. The remaining trades are held by the order management system of the present invention until trades with a higher sequence numbers are executed.

Figure 4:
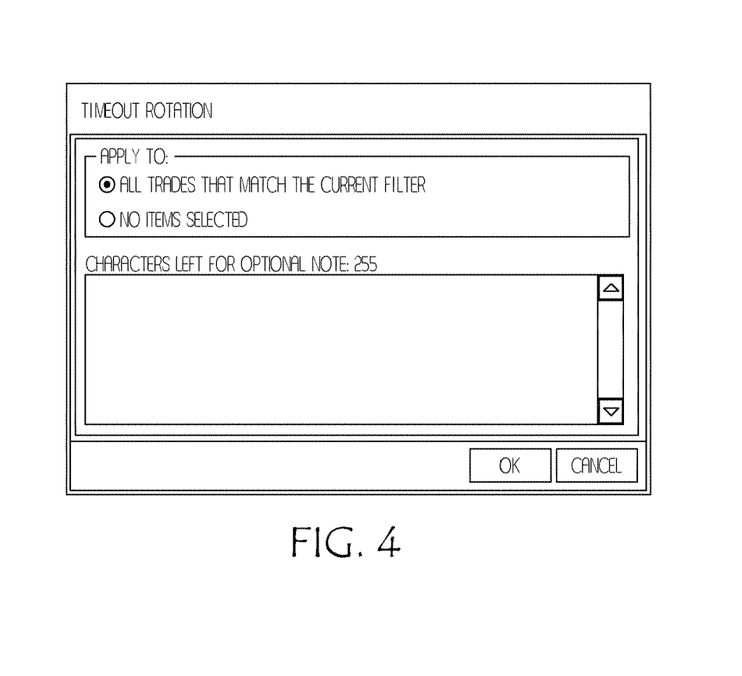
FIG. 4 shows an example of a form used to force a trade to timeout its trade rotation in accordance with the principles of the present invention.

In one embodiment, the held trades will be released to the market by the order management system of the present invention when the appropriate "event" occurs. FIG. 4 shows an example of a form used to force a trade to timeout its trade rotation in accordance with the principles of the present invention.

The following non-limiting example shows a list of events that allow a held trade to be released to market and is provided for illustrative purposes only:

| Event | Description |
|---|---|
| Fully Filled | The trade order has received executions totaling the amount of shares requested by the order. |
| DoneForDay | The trade order will receive no more executions for the rest of the day. |
| First Execution | The trade order received the first execution |
| Execution-Threshold | The trade order has an executed quantity or amount greater than a specified threshold. |
| Execution-Timeout | The trade order has been release for longer than a specified time without receiving executions. |
| Manual-Timeout | The trade order has been manually timeout by a trader. |

In one embodiment, rotation can occur on a round-robin basis. A round-robin rotation is a cycling sequence that goes in order, either first to last or last to first, giving members of the list a turn in the lineup. For example, suppose the trade rotation setup can be daily, and the rotation scheme has three sponsor/programs listed in it: Merrill—Consults; Prudential—ACCESS; Morgan Stanley—ACCESS. The round-robin method ensures that on day one, Merrill receives its assigned trades within a block first, Prudential gets its trades second, and Morgan Stanley is third; on day two, Prudential is first, Morgan Stanley second, and Merrill third; on day three, Morgan Stanley is first, Merrill second, and Prudential third; on day four the sequence begins anew with Merrill first.

An order management system in accordance with an embodiment of the present invention provides trade route and trade proxy configuration structures to support both order and allocation flows. The trade route represents where the order or allocation has to go. For each investment type or category of security (equity, fixed income, and mutual funds) the trade route references a trade proxy. The trade proxy defines methods that format the order or allocation along with specific configuration parameters that need to be passed to the function.

In one embodiment an order management system in accordance with the present invention additionally addresses the specialized trading issues associated with the managed accounts and other types of accounts in a wealth management segment. Specifically, an order management system in accordance with the embodiment of the present invention additionally addresses system scalability to handle large numbers of accounts with directed trading relationships, trade rotation, and the trading scenario where the sell-side firm automatically allocates partially filled order on behalf of the buy-side firm. In this trading scenario, the sell-side firm provides either an execution or allocation report that describes how trades were allocated. The order management system of the present invention takes these trade allocations as input, constructs an execution for the order, and processes the sell-side allocations as post-execution allocation instructions. During allocation processing, the post-execution allocation instructors are matched up against the account trades to determine the amount of the account level trade that was executed.

The issues with directed trading relationships and trade rotation are related. In accordance with the principles of the present invention, trade metadata is used to help the trade management process determine what it needs to do (e.g., sponsor, directed broker, custodian, program, trade size, etc. associated with the trade). With this information, an order management system of the present invention allows a trade to be released to a single route that can dynamically calculate how the order or allocation needs to be sent.

One embodiment of the order management system of present invention allows the directed trading relationships associated with the account to be handled by the system instead of the trader trying to remember how trades need to be sent and manually sending the trade by picking a route. This approach addresses trading errors where a trade is sent to the wrong broker.

Another embodiment of the order management system of present invention also allows the trade routes to be configured to follow rotation; therefore, this embodiment of the present invention gives the trader the ability to route directed trades using at most two routes for directed trades, where one route follows trade rotation and one route does not follow trade rotation. Whether those routes need to follow rotation or not is enforced by the system. This helps increase compliance with a firm's trade rotation compliance policy by ensuring the trader does not accidentally send trades out to a broker incorrectly. Instead, the trader just needs to send all large volume directed trades to the route following rotation and, if the firm's compliance policy allows it, use the non-rotation route to handle trades required to handle client-directed account setup, maintenance, and termination activity.

In accordance with the principles of the present invention, embodiments of the order management system of present invention may include a trade batch label property. The trade batch label property allows traders to define the scope of the trades to be rotated. A trade batch label property is added to the trade route stating whether the trade route "follows rotation". This trade batch label property allows the trading system of the present invention to determine whether trade rotation should be followed or not.

In further accordance with the principles of the present invention, a trade context and an allocation context are provided. Both types of contexts provide a list of characteristics that the trading system uses to calculate the proxy that is used to process an order or allocation. The context includes metadata information that is to be used to determine how a trade or allocation is to be sent. For example, "The "UBS Access Trading Context" would have metadata properties called "sponsor" set to "UBS" and "program" set to "ACCESS" while the "UBS Mac Trading Context" would have a metadata properties called "sponsor" set to "UBS" and program set to "MAC". Trade context includes a reference to the trade proxy that handles the formatting of the trade or allocation.

In accordance with the principles of the present invention, a direct reference to the trade proxy is removed from the trade route and replaced with a reference to the trade context and the allocation context. This reference can either directly reference a trade route by name or reference a trade route by specifying an ordered set of metadata that can be use calculate the trade context or allocation context. If a named trade context or allocation context is used, then the order management system of present invention uses the named context to determine the proxy to use.

If a metadata-based approach is used, then the trading system of the present invention looks at the metadata associated with the context and compares it with the metadata associated with the trade or allocation using the metadata list specified by the route. The order management system of present invention attempts to match the metadata and find the context with the most specific match to the metadata possible, relaxing the search criteria if needed by removing elements from the ordered metadata list one at a time starting with the last element in the list. If no match is found, then the trade is tagged with a routing error; else wise, the matched context is used to determine the proxy for formatting and sending the trade or allocation. For example, consider a trade to the Merrill sponsor, CONSULTS program. If the route specified that the trade metadata "sponsor" and "program" was to be used to determine the context, the order management system of present invention would look up the "sponsor" and "program" metadata attributes of the trade, which are "Merrill" and "CONSULTS" respectively. Having these two values, the order management system of present invention attempts to find a trading context that has the metadata attributes "sponsor" set to "Merrill" and "program" set to "CONSULTS". If the order management system of present invention finds a match, that trading context is used to determine the trading proxy that handles the trade. If the order management system of present invention does not find an exact match, then the most specific metadata value "program" is removed from the search criteria and a trading context with a metadata attribute of "sponsor" set to "Merrill" is searched. If the order management system of present invention cannot find a trading context with a metadata sponsor attribute set to "Merrill", the match fails.

Thus, the order management system of present invention can be configured in a number of different ways, supporting a variety of different uses. The trade route can directly reference a trade context and allocation context by name. This provides full compatibility with the standard order management system behavior. This type of routing is highly manual, but is the trading methodology traders today use to communicate trades and allocations.

The following non-limiting example shows how the invention could be configured to support this type of behavior and is provided for illustrative purposes only and is not intended to limit the scope of the invention. In this non-limiting example, the sponsor and program are the characteristics being used to make trade routing decisions:

| Security | Side | Sponsor | Program |
|---|---|---|---|
| IBM | BUY | MRL | Consults |
| IBM | BUY | UBS | Access |
| IBM | BUY | UBS | Mac |

| Route Name | Follows Rotation | Investment Type | Trade Context | Trade MetaData | Allocation Context | Allocation MetaData |
|---|---|---|---|---|---|---|
| Merrill | No | Equity | Merrill | | Merrill | |
| UBS-Mac | No | Equity | UBS-Mac | | UBS-Mac | |
| UBS-Access | No | Equity | UBS-Access | | UBS-Access | |

| Trade Context Name | Metadata | Proxy Name |
|---|---|---|
| Merrill | | MerrillTradeProxy |
| UBS-Mac | | UBSMacTradeProxy |
| UBS-Access | | UBSAccessTradeProxy |

| Allocation Context Name | Metadata | Proxy Name |
|---|---|---|
| Merrill | | MerrillAllocationProxy |
| UBS-Mac | | UBSMacAllocationProxy |
| UBS-Access | | UBSAccessAllocationProxy |

In this example scenario, the trader has three separate trades to make to two brokers: Merrill and UBS. UBS has different trading systems so the trader needs to send the trade to the right trading system by knowing with which trading system the account is associated. To accomplish this task, the trader selects a trade and releases it to a route manually. Furthermore, since the number of trade routes increases, at minimum, linearly with the number of brokers the trader is working with, it is easy to see how this type of manual step of the prior art is inefficient in getting trades to the market quickly and is error-prone, especially when a single broker has multiple trading systems from which the trade needs to select. In addition to determining how to send the trade, the trader also needs to keep track of why the trade was done and whether this group of trades need to follow trade rotation. In the event that the trades need to follow trade rotation, the trader needs to actively follow each trade and, as one trade finishes executing, release the next trade in accordance with the firm's trade rotation policy.

In accordance with the principles of the present invention, the trade route can reference a trade context and allocation context by metadata. This allows trades and allocations to be sent to multiple sponsors using a single trade route. This type of routing is needed to when dealing with directed trading scenarios required in for example managed accounts, institutional accounts, and private wealth accounts.

The following non-limiting example shows how the invention could be configured to support this type of behavior and is provided for illustrative purposes only and is not intended to limit the scope of the invention. In this non-limiting example, the sponsor and program are the characteristics being used to make trade routing decisions:

| Security | Side | Sponsor | Program |
|---|---|---|---|
| IBM | BUY | MRL | Consults |
| IBM | BUY | UBS | Access |
| IBM | BUY | UBS | Mac |

| Route Name | Follows Rotation | Investment Type | Trade Context | Trade MetaData | Allocation Context | Allocation MetaData |
|---|---|---|---|---|---|---|
| Directed w/ Rotation | Yes | Equity | | Sponsor, Program | | Sponsor, Program |
| Directed w/o Rotation | No | Equity | | Sponsor, Program | | Sponsor, Program |

| Trade Context Name | Metadata | Proxy Name |
|---|---|---|
| | Sponsor = "Merrill" | MerrillTradeProxy |
| | Sponsor = "UBS", Program = "Mac" | UBSMacTradeProxy |
| | Sponsor = "UBS", Program = "Access" | UBSAccessTradeProxy |

| Allocation Context Name | Metadata | Proxy Name |
|---|---|---|
| | Sponsor = "Merrill" | MerrillAllocationProxy |
| | Sponsor = "UBS", Program = "Mac" | UBSMacAllocationProxy |
| | Sponsor = "UBS", Program = "Access" | UBSAccessAllocationProxy |

In this example scenario, the trader has only to select from one of two routes. That decision is purely based on why the trade is being done. Once that decision is made, the trade releases the trade to specified route and the order management system of the present invention handles it from there. An important aspect of the present invention is that the number of routes do not increase with the number of relationships. For example, the invention could allow the trade to have a directed relationship with 100 directed brokers and require only two routes to those brokers. Both routes specify that the "Sponsor" and "Program" attributes of the trade are to be used to select the proper trade and allocation contexts. For the Merrill trade, this resulting in Sponsor="Merrill" and Program="Consults". The order management system of the present invention first attempts to find a trade route with both those properties The trade route can reference a trade context by name and can reference an allocation context by metadata. This provides a route where all trades go to a named party, but lets the allocations go to different sponsors or custodians. This type of routing is needed when performing a step-out trade, which is done on a regular basis by large investment managers for their managed accounts, institutional accounts, and private wealth accounts. The trade route can reference a trade context by metadata but an allocation context by name. This type of routing is needed by traders at brokerages when dealing with accounts requiring directed trading, but that are custodied at the broker.

Sell-side partial execution processing also causes challenges for managed accounts managers. These challenges are especially a problem for larger firms who have large number of accounts, resulting in large order sizes that are more difficult to fill and for firms who deal with securities with liquidity limitations (e.g., many fixed income securities). In both cases, the likelihood of a partially filled order increases. When the sell-side firm automatically allocates the partially filled order, the random or pro-rate allocation methodologies used to allocate executions in the prior art make it highly likely that the allocation of the order on the buy-side will match the allocation done on the sell-side. Therefore, the only way to match up the sell-side allocation is to cancel the original order and manually renter the sell-side order on the buy-side and book it as a fully executed order. This manual approach has several disadvantages: it is inefficient, it increases the cost of processing the order, it is can be error-prone, and it causes the trading system to lose the trading information between the buy-side and sell-side which can impact best execution analysis. If this manual workaround is not done, there is a high likelihood of that reconciliation of the accounts the next day will be negatively impacted and will require significant manual effort to match up the trade activity on the buy-side with the trade activity on the sell-side. This reconciliation issue occurs because allocation methods used to allocate executed order make it highly unlikely for the buy-side firm to exactly match the allocations of the sell-side firm. These two allocation methods are discussed below.

With random allocation, the method randomly selects accounts and fully satisfies requested order amount until the total amount in the partially filled order is allocated. This method results in a zero or more fully allocated accounts; zero or one partially allocated accounts; and zero or more unallocated accounts. Since the buy-side and sell-side are both randomly picking accounts, it is easy to see how they will never match each other.

With pro-rata allocation, the goal is to provide every account with the same amount of shares, even though the allocation may not fully satisfy the request number of shares for any account. On the surface, this allocation method would seem to allow the buy-side and sell-side firms to match up their account level allocations; however, that is only true if the number of shares being allocated to each account is less than the shares requested by all accounts and the number of total shares purchases is evenly divisible by the number of accounts. If both these conditions hold true, then the sell-side and buy-side can independently allocate shares pro-rata and match on their allocations. If both these conditions do not hold true, then there are some extra shares that need to be allocated to some accounts. These extra shares end up being allocated randomly, resulting in one or more accounts getting slightly more shares than the rest. This random aspect of the allocation makes matches unlikely and, with large number of accounts, causes significant reconciliation issues with partial fills.

In addition, this manual reconciliation processing impacts the buy-side firm in several ways. As account volumes grow, reconciliation staffing also needs to grow, increasing costs and decreasing margins. Manually adjusting these quantities results in errors: if bad trades are made due to these errors, the buy-side firm may be financially liable for those trades. Manually adjusting the quantities takes time: since the buy-side firm needs to treat all accounts fairly, the firm cannot trade any of their related accounts until these errors are fixed; therefore, if accounts cannot be reconciled before the market opens, the buy-side firm is exposed to market conditions due to their inability to trade these accounts.

The present invention addresses at least some of these problems by extending the order management system to support a new type of execution non-limitedly referred to herein as execution with post-execution allocation instructions. This type of execution not only provides standard execution information, but also contains the account level allocation details. The order management system of the present invention can either accept this new type of execution or construct one from a list of account trades by grouping related trades back into a single execution. As part of the allocation processing logic, the order management system of the present invention uses the post-execution allocation information to locate the account level trades that need to receive allocations and allocates the executed order to those accounts using the information in the post-execution allocation instructions. This approach allows the buy-side firm to match the partial order allocation done by the sell-side firm resulting in no reconciliation breaks.

Figure 5:
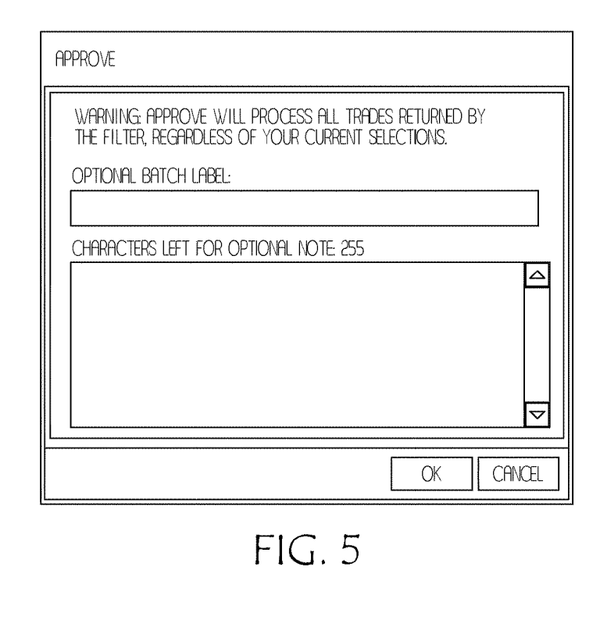
FIG. 5 shows an example of a display for modifying trade rotation lists.

Thus, the present invention provides the ability to define and manage one or more trade rotation lists that govern how trades are release or govern how executed trades are allocated. Each item in the list is defined by one or more characteristics that are used to uniquely match a trade to assign the sequence number to that trade. The rotation list may be a list of items or the rotation list may be a hierarchical list containing rotation lists as items. There may be separate rotation lists that vary based on some characteristic. These characteristics can include investment type (e.g., equities, fixed income, mutual funds) and product type (e.g., mutual funds, managed accounts, institutional accounts). FIG. 5 shows an example of a display for modifying trade rotation lists.

Embodiments of the present invention further provide the ability to define a rotation policy for each list independent of whether the list is flat list of elements or a hierarchical list containing other lists. The rotation policy defines an eligibility policy for items in a list, a rotation method for each list, and the rotation schedule for each list. The eligibility policy defines which items are eligible for rotation. Alternatives include all items are eligible for rotation, and only items that have had trades associated with them since last rotation are eligible for rotation. If an item is not eligible for rotation, the rotation method does not change the sequence number of the item unless the change in the sequence number improves the rotation order of the item.

The rotation methods can include not rotated, round-robin, and random. In not rotated, the items in the list do not under go rotation. In random, a sequence number is randomly assigned to all items. Non-eligible items maintain their existing sequence number unless the new sequence number improves the position of the non-eligible item.

In round-robin rotation method, each item in the list is rotated in a round-robin fashion. The round-robin method could rotate the sequence number associated with an item by either increasing the number or decreasing the number. The increasing number round-robin increments the sequence number associated with all eligible items. If all items are eligible, the first item in the list is made the second item, the second item in the list the third item, etc. The last item in the list becomes the first item in the list after rotation. Non-eligible items are not rotate and maintain their current sequence number.

The decreasing number round-robin decrements the sequence number associated with all items. The third item is made the second item, the second item the first item, and the first item becomes the last item in the list. Non-eligible items can either maintain their existing sequence number or participate in the rotation as long as the rotation algorithm would not worsen their position in the list.

The rotation listed can rotate due to various system events. The rotation listed can rotate manually as triggered by a user. The rotation listed can rotate at a scheduled time event (e.g., every hour, every day, every week, etc.). The rotation listed can rotate at a trading event (e.g., rotate for each new security added in the system, rotate for each new trade batch, rotate on release of a trade batch, etc.). When trade rotation is done, the resulting list is captured with a timestamp associated with the list. These historical lists can be reported on for compliance/audit.

Trade blotters in the system can have their own trade rotation lists. Rotation sequence numbers are assigned to trades when the trades are brought into the trade blotter using the currently active trade rotation list. The sequence number assignment is done by comparing the trade's criteria against the criteria for each item in the trade rotation list until a match is found. If not match is found, then the trade is not assigned a sequence number and cannot participate in trade rotation.

Figure 6:
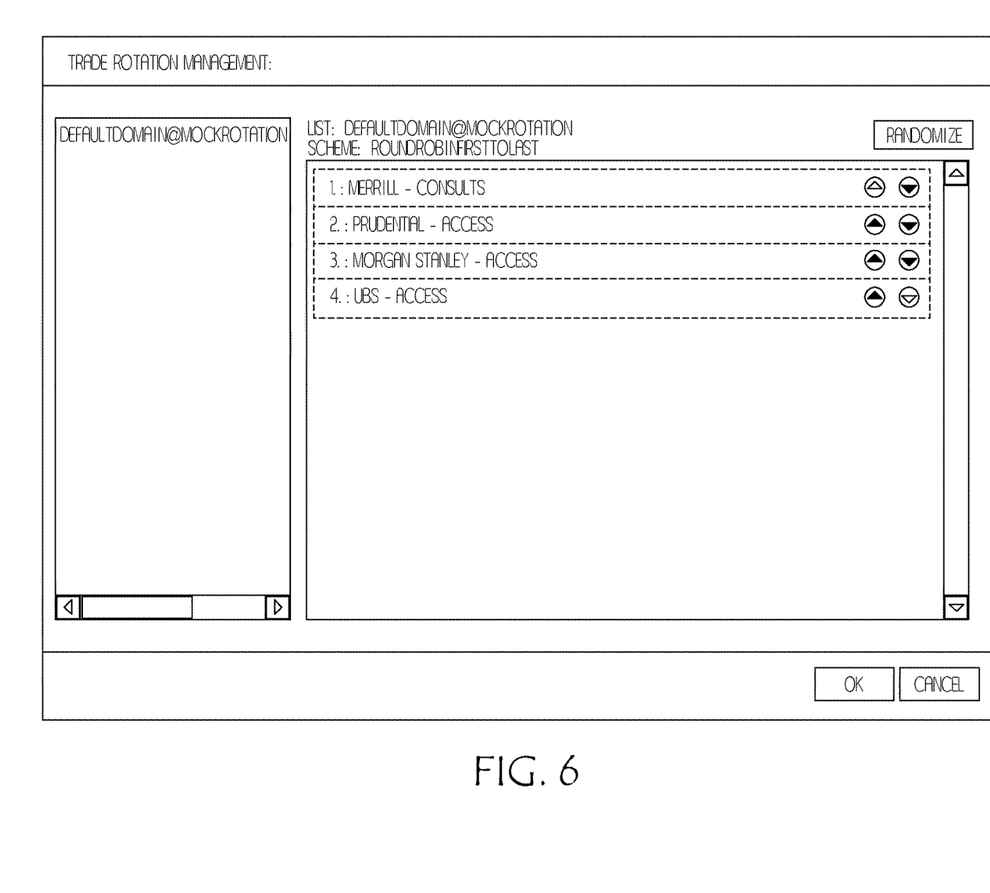
FIG. 6 show an example of a form used to assign or modify the batch label associated with a block in accordance with the principles of the present invention

A trade batch label can be assigned to the trade. Assigning a trade to a new batch label can optionally change the trade's rotation sequence number to the sequence number associated with the batch label. The trade batch label defines the scope for trade rotation. FIG. 6 show an example of a form used to assign or modify the batch label associated with a block in accordance with the principles of the present invention The following non-limiting example shows how the invention uses batch labels to control the scope of the trade rotation logic and is provided for illustrative purposes only and is not intended to limit the scope of the invention:

| Example - Trades with Different Batch Labels | | | | |
|---|---|---|---|---|
| Security | Side | Sponsor | Seq | Batch Label |
| GE | BUY | SB | 2 | trade-batch-a |
| GE | BUY | UBS | 3 | trade-batch-a |
| APPL | BUY | SB | 2 | trade-batch-a |
| APPL | BUY | UBS | 3 | trade-batch-b |

When the trades are released by the trader, the trades will be processed in the following way:

| Security | Side | Sponsor | Seq | Batch Label | Status |
|---|---|---|---|---|---|
| GE | BUY | SB | 2 | trade-batch-a | Released to Market |
| GE | BUY | UBS | 3 | trade-batch-a | Awaiting GE BUY SB |
| APPL | BUY | SB | 2 | trade-batch-a | Released to Market |
| APPL | BUY | UBS | 3 | trade-batch-b | Released to Market |

Trades released for the Sponsor "SB" are sent immediately to the market because there are no similar trades with a higher rotation sequence present. The GE BUY for UBS is held up because it is similar to the GE BUY for SB and has the same Batch Label; however, the APPL BUY for UBS is also released to the market immediately even though it is similar to the APPL BUY for SB because the two trades have different batch labels.

A trade proxy defines the method used to format and the protocol used to communicate the trade as well as any configuration information needed by that method. Trade proxies can be used to communicate both trade orders and allocations. The following non-limiting example describes different methods used to communicate trade activity and is provided for illustrative purposes only and is not intended to limit the scope of the invention:

| Trade Type | Trade Format | Communication Protocol |
|---|---|---|
| Order | FIX | FIX |
| Order | File | FTPS |
| Order | XML | WebService |
| Allocation | FIX | FIX |
| Allocation | File | HTTPS |
| Allocation | XML | WebService |

A trade context references a trade proxy and contains other properties that are used when processing trade orders. One property is the "maximum time to wait", which defines how long to wait for the order to be fully executed before timing out. If the order is not fully executed by the time specified by the "maximum time to wait" property, the order management system of the present invention will timeout the trade and allow the next trade in the rotation to proceed. A trade context contains a list of items with each item having a name and a value. This list is used by the present invention to route trade orders. An allocation context references a trade proxy and contains a list of items with each item having a name and a value. This list is used by the order management system of the present invention to route allocations.

Trade routes define the method used to communicate trades. A trade route can be configured in the system to support trade orders only, allocations only or both.

Trade routes that support trade orders reference a trade context. The trade context reference can be by name. The trade context reference can be by ordered list of metadata characteristics. Characteristics include sponsor, sponsor program or other user-defined characteristic.

Trade routes that support trade allocations are configured with an allocation context. The allocation context reference can be by name. The allocation context reference can be by an ordered list of metadata characteristics. Characteristics include sponsor, sponsor program or other user-defined characteristic.

A trade route can be configured to support trade rotation or not. A trade route can be configured in a variety of ways to support common trade and allocation scenarios. These can include a static trade route, a fully dynamic trade route, a hybrid trade route, a step-out trade route, and a directed broker trade route.

A static trade route references a trade context by name and/or allocation context by name. A fully dynamic route is configured so both trade and allocation context are reference via metadata characteristics. A hybrid route is configured so that there is one context that is reference by name and one context that referenced by metadata characteristics. A step-out route consists of a trade context that is referenced by name and an allocation context is reference by metadata characteristics. A directed broker route consists of a trade context that is referenced by metadata and an allocation context that is referenced by name.

When a trade order is released to a trade route, the system determines what proxy to use to send the order and whether to apply trade rotation to the route. If the trade route references a trading context by name, then the trade order is directly routed to the trade proxy associated with the trading context. If the trade route references the trading context by metadata characteristics, then the system will calculate the trade context to be used by looking up the metadata of an order using the metadata characteristics specified in the trade route and match that to the metadata values of the trading context. The system will try to find the trading context that best matches the metadata characteristics of the order. Once the trading context is matched, then the route will use the trade proxy associated with matched trading context to process the trade order.

If the route is configured to support trade rotation, then the trade order is evaluated to see if another similar order with a higher rotation priority is already released, is being processed, and has not timed out. If a similar order matching the criteria exists, then the trade order is put into a queued state. If no other trade order with a higher rotation order exists, then the order is released gets sent via the proxy. Queued trade orders get released when one of several events occur: Queued trade orders get released when the order it is waiting for full fills. Queued trade orders get released when the order it is waiting for partially fills and is closed. Queued trade orders get released when the order it is waiting for time out. The time out might be calculated by the system or the time out might be done by the user.

When an allocation is released to a trade route, the system determines what proxy to use to send the allocation. If the trade route references an allocation context by name, then the allocation is directly routed to the trade proxy associated with the trading context. If the trade route references the allocation context by metadata characteristics, then the system will calculate the allocation context to be used by looking up the metadata of allocation using the metadata characteristics specified in the trade route and matching that to the metadata values of the trading context. The system will try to find the allocation context that best matches the metadata characteristics of the allocation. Once the trading context is matched, the route will use the trade proxy associated with matched allocation context to process the allocation.

The logical operations of the various aspects and embodiments disclosed and claimed are implemented (1) as a sequence of computer implemented acts or program modules running on a computing device and/or (2) as interconnected machine logic circuits or circuit modules within the computing device. The implementation is a matter of choice dependent on the performance requirements of the system implementing the various embodiments. Accordingly, the logical operations making up the embodiments of the present invention described herein may be referred to variously as operations, structural devices, acts or modules. It will be recognized by one skilled in the art that these operations, structural devices, acts and modules may be implemented in software, in firmware, in special purpose digital circuit logic, and any combination thereof without deviating from the spirit and scope of the present invention as recited within the claims attached hereto.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

What is claimed is:

1. A computer-implemented method of managing trade orders through facilities of an electronic-trading platform for improving efficiency of a trading computer system by implementing a metadata-based, order-management system to format and send a trade electronically over a network to different executing brokers, comprising:
   at memory of the electronic-trading platform, receiving an identity of an investor;
   by a processor in communication with memory of the electronic-trading platform, creating an account for the investor;
   at memory of the electronic-trading platform, receiving a request to perform said trade on the account, the request including a direct reference to a trade proxy in a trade route within the metadata-based, order-management system;
   by said processor in communication with memory of the electronic-trading platform, replacing the direct reference to the proxy from the trade route with metadata, wherein the trade route within the metadata-based, order-management system comprises a trade context and an allocation context, wherein each of the trade context and the allocation context includes a list of characteristics that are used to calculate a proxy that is used to process an order or an allocation, and wherein the metadata includes information that is used to determine how a trade or an allocation is to be sent;
   by said processor in communication with memory of the electronic-trading platform, comparing the metadata with each of metadata associated with the trade context and metadata associated with the allocation context;
   by said processor in communication with memory of the electronic-trading platform, determining which of the metadata associated with the trade context and metadata associated with the allocation context is a close match with the metadata;
   by said processor in communication with memory of the electronic-trading platform, based on a determination that the metadata matches the metadata associated with the trade context, determining a proxy for formatting and transmitting said trade electronically over said network to different executing brokers based on the matched metadata associated with the trade context;
   by said processor in communication with memory of the electronic-trading platform, based on a determination that the metadata matches the metadata associated with the allocation context, determining a proxy for formatting and transmitting said trade electronically over said network to different executing brokers based on the matched metadata associated with the allocation context;

by said processor in communication with memory of the electronic-trading platform, based on the proxies automatically formatting and sending the trade electronically over said network to different executing brokers;

by said processor in communication with memory of the electronic-trading platform, based on a determination that the metadata does not match either the metadata associated with the trade context or the metadata associated with the allocation context, tagging the request to perform the trade with a routing error; and automatically electronically updating the account for the investor in memory of the electronic-trading platform.

2. The computer-implemented method of managing trade orders through facilities of an electronic-trading platform of claim 1, further comprising:

by said processor in communication with memory of the electronic-trading platform, defining at least one trade rotation list that governs trades; and by said processor in communication with memory of the electronic-trading platform, defining items on the trade rotation list by at least one characteristic that is used to match said trade by assigning a sequence number to that trade.

3. The computer-implemented method of managing trade orders through facilities of an electronic-trading platform of claim 2, further including, by said processor in communication with memory of the electronic-trading platform, defining at least one trade rotation list that governs how trades are released.

4. The computer-implemented method of managing trade orders through facilities of an electronic-trading platform of claim 2, further including, by said processor in communication with memory of the electronic-trading platform, defining at least one trade rotation list that governs how trades executed trades are allocated.

5. The computer-implemented method of managing trade orders through facilities of an electronic-trading platform of claim 2, further including, by said processor in communication with memory of the electronic-trading platform, defining at least one trade rotation flat list.

6. The computer-implemented method of managing trade orders through facilities of an electronic-trading platform of claim 2, further including, by said processor in communication with memory of the electronic-trading platform, defining at least one trade rotation hierarchical list of lists.

7. The computer-implemented method of managing trade orders through facilities of an electronic-trading platform of claim 2, further including, by said processor in communication with memory of the electronic-trading platform, defining at least one trade rotation list that varies based on a characteristic.

8. The computer-implemented method of managing trade orders through facilities of an electronic-trading platform of claim 2, further including, by said processor in communication with memory of the electronic-trading platform, defining separate rotation lists that vary based on investment type.

9. The computer-implemented method of managing trade orders through facilities of an electronic-trading platform of claim 2, further including, by said processor in communication with memory of the electronic-trading platform, defining separate rotation lists that vary based on product type.

* * * * *